United States Patent
Kuriyama et al.

[11] Patent Number: 5,173,822
[45] Date of Patent: Dec. 22, 1992

[54] MULTI-LAYER THIN FILM MIG MAGNETIC HEAD

[75] Inventors: Ioshihiro Kuriyama, Nagaoka; Shushi Saoshita, Toyama; Shoji Saitoh, Nagaoko, all of Japan

[73] Assignee: Alps Electric Co., Ltd., Tokyo, Japan

[21] Appl. No.: 678,566

[22] Filed: Mar. 29, 1991

[30] Foreign Application Priority Data

Apr. 3, 1990 [JP] Japan .................................. 2-88467

[51] Int. Cl.⁵ .............................................. G11B 5/235
[52] U.S. Cl. .................................................... 360/120
[58] Field of Search ........................ 360/119, 120, 126

[56] References Cited

U.S. PATENT DOCUMENTS

| | | | |
|---|---|---|---|
| 4,669,015 | 5/1987 | Ruigrok | 360/119 |
| 4,742,412 | 5/1988 | Kuriyama | 360/119 |
| 4,953,049 | 8/1990 | Okuda et al. | 360/120 |
| 5,001,589 | 3/1991 | Rask et al. | 360/120 |

*Primary Examiner*—Robert S. Tupper
*Attorney, Agent, or Firm*—Guy W. Shoup; David W. Heid; B. Noel Kivlin

[57] ABSTRACT

A magnetic head of the metal-in-gap type is provided with improved recording characteristics accomplished by increasing the thickness of the thin film layer(s) in a magnetic gap. This magnetic head has several thin film layers and an intermediate layer made of a non-magnetic metal, such as chrome or titanium, interposed between each adjacent thin film layer. The use of the intermediate layer results in the reduction of eddy current losses and film stress thereby improving the recording characteristics of the magnetic head.

4 Claims, 1 Drawing Sheet

MULTI-LAYER THIN FILM MIG MAGNETIC HEAD

BACKGROUND OF THE INVENTION

This invention relates to a magnetic head of the so-called metal-in-gap type, that is, a magnetic head of the type wherein a thin film layer of a magnetic metal is provided in a magnetic gap.

DESCRIPTION OF THE PRIOR ART

As a magnetic head for use with a fixed disk, such a magnetic head of a specific type called metal-in-gap gap type as shown in FIG. 3 is known. Referring to FIG. 3, the magnetic head shown includes a thin film layer 3 provided on one of a pair of opposing end faces of a pair of magnetic cores 1a and 1b made of ferrite with a ground layer 2 of chrome or the like interposed in between. The thin film layer 3 is made of a magnetic metal such as, for example, a Fe-Al-Si-base alloy (Sendust), a permalloy or an amorphous metal. A gap layer 4 made of $SiO_2$ or the like is formed as a magnetic gap between the magnetic metal thin film layer 3 and the opposing end face of the other magnetic core 1b. The ground layer 2 is provided to prevent possible diffusion of the magnetic metal thin film layer 3 into the magnetic core 1a and to provide a countermeasure for a secondary gap, but sometimes such ground layer 2 is omitted.

With a magnetic head of such metal-in-gap type as described above, it is considered that, if the thickness of the magnetic metal thin film layer 3 is increased, then the recording characteristic of the magnetic head is improved in principle. Actually, however, it is confirmed that mere increase of the thickness of the thin film layer 3 will not improve the recording characteristic of the magnetic head very much, and the upper limit to such thickness is normally 2 $\mu$m or so. While the reason is not definite, it is considered that this arises from the fact that the eddy current loss increases as the thickness of the thin film layer 3 increases or the film stress is increased by thermal deformation of the thin film layer 3 upon bonding of glass.

SUMMARY OF THE INVENTION

It is an object of the present invention to provide a magnetic head of the metal-in-gap type wherein the recording characteristic thereof can be improved sufficiently by increasing the thickness of a thin film layer in a magnetic gap.

According to the present invention, there is provided a magnetic head of the metal-in-gap type wherein a thin film layer made of a magnetic metal is provided in a magnetic gap, wherein the magnetic head comprises a plurality of such thin film layers, and an intermediate layer made of a non-magnetic metal such as chrome or titanium and interposed between each adjacent ones of the thin film layers.

According to the present invention, a great total thickness of a thin film layer is assured by arranging a plurality of thin film layers of a smaller thickness in layers while an intermediate layer of a non-magnetic metal is interposed between each adjacent ones of the thin film layers. With the magnetic head of the present invention, a possible increase in eddy current loss or film stress where a single thin film layer is merely increased in thickness is restricted due to presence of the intermediate layer, and consequently, an improved recording characteristic is assured.

DESCRIPTION OF THE PREFERRED EMBODIMENT

Figure 1:
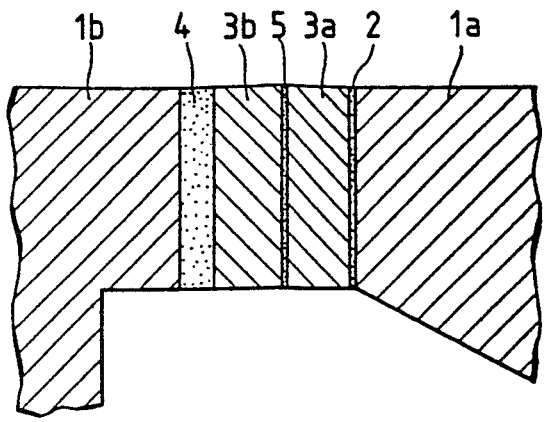
FIG. 1 is an enlarged sectional view of a magnetic gap portion of a magnetic head according to an embodiment of the present invention.

In the following, a magnetic head according to an embodiment of the present invention will be described with reference to FIGS. 1 and 2.

Figure 3:
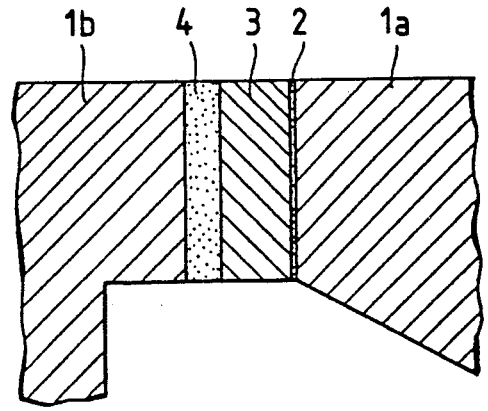
FIG. 3 is an enlarged sectional view of a magnetic gap portion of a conventional magnetic head.

The magnetic head of the present embodiment is constituted as a magnetic head of the metal-in-gap type for use with a fixed disk similarly as the conventional magnetic head shown in FIG. 3. In the magnetic head of the present embodiment, however, two thin film layers 3a and 3b are provided in layers in a magnetic gap with an intermediate layer 5 held in between as seen in FIG. 1.

The thin film layers 3a and 3b are made of a magnetic metal such as, for example, a Fe-Al-Si-base alloy (Sendust), a permalloy or an amorphous metal, similarly as the thin film layer 3 of the conventional magnetic head. A chrome layer is provided as a ground layer 2 between the lower side thin film layer 3a and a magnetic core 1a while a gap layer 4 made of $SiO_2$ is formed between the upper side thin film layer 3b and the other magnetic core 1b. Preferably, each of the thin film layers 3a and 3b is 1.2 to 2.0 $\mu$m thick or so (the total thickness of the thin film layers 3a and 3b is 2.4 to 4.0 $\mu$m or so).

Meanwhile, the intermediate layer 5 is made of a non-magnetic metal such as chrome or titanium, and preferably, the thickness thereof is 50 to 500 Å or so.

Since a plurality of such thin film layers 3a and 3b are layered with the intermediate layer 5 of a non-magnetic metal interposed in between, a larger total thickness of the thin film layers 3a and 3b can be assured without increasing the thickness of each of the thin film layers 3a and 3b very much. Consequently, the magnetic head has improved recording characteristic when compared with a conventional magnetic head which has a single thin film layer therein, as apparently seen from a result of an experiment as an example described below. It is considered that a possible increase of an eddy current loss or film stress which is produced significantly where such thin film layer is merely increased is reduced due to the presence of the intermediate layer 5.

EXAMPLE

A magnetic head according to the present invention was made wherein the thin film layers 3a and 3b are made of a Fe-Al-Si-base alloy each with a thickness of 1.5 $\mu$m (the total thickness of the two layers 3a and 3b is 0.3 $\mu$m) and a chrome layer of 200 Å thick is provided as the intermediate layer 5. A recording characteristic of the magnetic head was measured together with those of two conventional magnetic heads A and B for the comparison. Results are shown in FIG. 2. The conventional article A has a single thin film layer of 1.5 $\mu$m thick made of a Fe-Al-Si-base alloy while the other conventional article B has a single thin film layer of 3.0 μm thick similarly made of a Fe-Al-Si-base allow.

Figure 2:
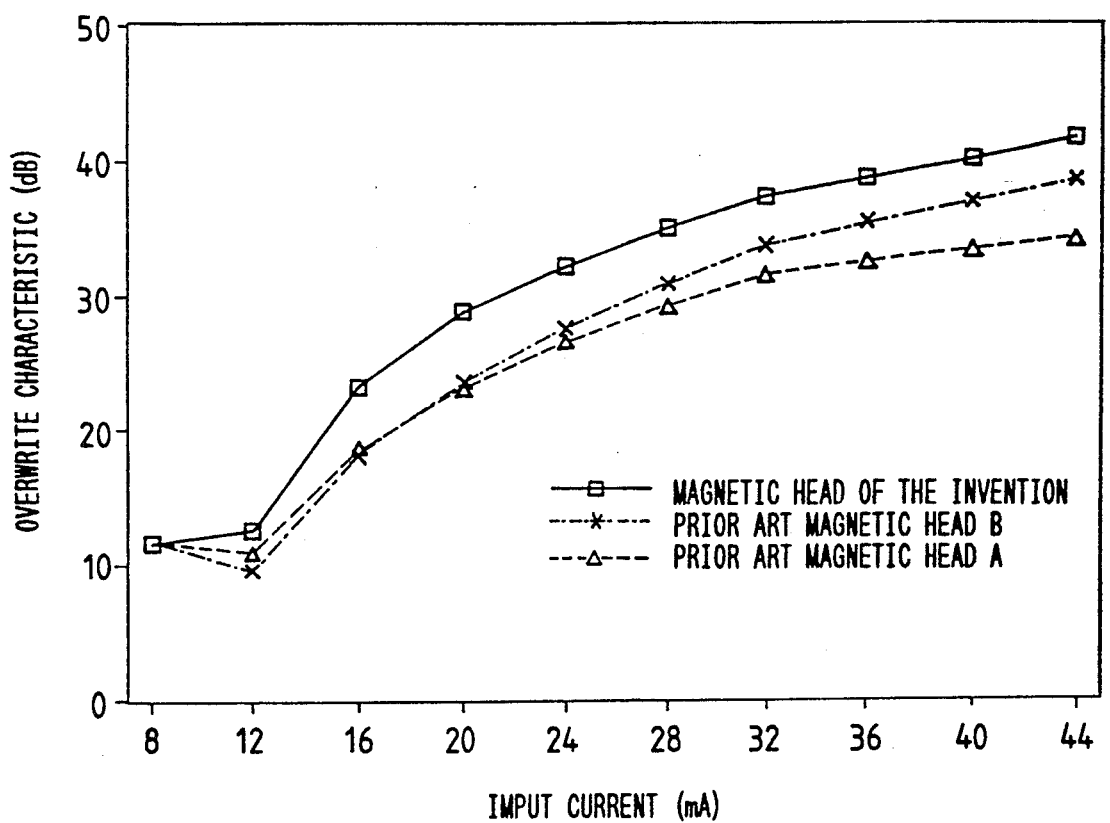
FIG. 2 is a diagram illustrating a recording characteristic of the magnetic head of FIG. 1 in comparison with those of conventional magnetic heads.

As can be seen clearly from FIG. 2, the magnetic head according to the present invention is improved in overwrite characteristic by several dB or so comparing with the conventional magnetic head A wherein the thickness of the thin film layer is just half that of the magnetic head according to the present invention. Further, it was confirmed that the magnetic head according to the present invention is improved in overwrite characteristic by 2 to 3 dB or so also comparing with the other conventional magnetic head B wherein the thickness of the thin film layer is equal to a total thickness of the two thin film layers 3a and 3b.

It is to be noted that, while the two thin film layers 3a and 3b are layered in the embodiment described above, naturally a greater number of such thin film layers may otherwise be layered.

Further, while it may seem recommendable to employ some other substance than non-magnetic metals, such as, for example, $SiO_2$, for the intermediate layer 5, a sufficient contacting strength with another film cannot be assured with such intermediate film, and consequently, such intermediate film may be exfoliated readily at a film forming stage. Accordingly, a good product cannot be obtained.

As described in detail so far, a magnetic head of the present invention comprises a plurality of thin film layers made of a magnetic metal and disposed in a magnetic gap and an intermediate layer made of a non-magnetic metal such as chrome or titanium and interposed between each adjacent ones of the thin film layers. The magnetic head has a superior effect that the recording characteristic thereof can be improved by increasing the total thickness of the thin film layers, comparing with a magnetic head wherein the thickness of a single thin film layer is merely increased.

What is claimed is:

1. A magnetic head of the metal-in-gap type having a first thin film layer made of a magnetic metal provided on one of a pair of opposing end faces of a pair of magnetic cores that define a magnetic gap, a non-magnetic oxide gap layer disposed on the other opposing end face, wherein said magnetic head further comprises:

a plurality of magnetic thin film layers disposed between said first thin film layer and said non-magnetic oxide gap layer; and an intermediate layer made of a non-metallic metal of chrome or titanium and interposed between each of said magnetic thin film layers.

2. A magnetic head according to claim 1, wherein said magnetic thin film layers are made of a Fe-Al-Si-base alloy.

3. A magnetic head according to claim 1, wherein said magnetic head includes two magnetic thin film layers each having a thickness of 1.2 to 2 μm.

4. A magnetic head according to claim 1, wherein the thickness of said chrome or titanium intermediate layer is 50 to 500 Å.

* * * * *

UNITED STATES PATENT AND TRADEMARK OFFICE
CERTIFICATE OF CORRECTION

PATENT NO.   : 5,173,822
DATED        : December 22, 1992
INVENTOR(S)  : Kuriyama et al.

It is certified that error appears in the above-identified patent and that said Letters Patent is hereby corrected as shown below:

On the title page, Item [75]:
Inventors should be read as follows:

Inventors: Toshihiro Kuriyama, Nagaoka; Shushi Saoshita, Toyama; Shoji Saitoh, Nagaoko, all of Japan Signed and Sealed this Twenty-sixth Day of October, 1993

Attest:

BRUCE LEHMAN

*Attesting Officer*  *Commissioner of Patents and Trademarks*